United States Patent
Cuckson et al.

[15] 3,664,900
[45] May 23, 1972

[54] METHOD OF TREATING A LENGTH OF MATERIAL

[72] Inventors: Kenneth Cuckson, Derby; Gerald W. Chapman, Ockbrook, both of England

[73] Assignee: Rolls-Royce Limited, Derbyshire, England

[22] Filed: May 1, 1969

[21] Appl. No.: 820,973

[52] U.S. Cl. .............................. 156/174, 117/46, 156/272, 264/29
[51] Int. Cl. ................................ C01b 31/07, B65h 81/00
[58] Field of Search ................ 117/46; 156/174, 173, 172, 156/272; 242/118.32; 264/29

[56] References Cited

UNITED STATES PATENTS

| | | | |
|---|---|---|---|
| 3,444,019 | 5/1969 | Leeuwen | 156/172 X |
| 3,120,460 | 2/1964 | Schell et al. | 156/187 |
| 3,242,000 | 3/1966 | Lynch | 117/46 |
| 3,367,812 | 2/1968 | Watts | 117/46 X |
| 3,395,970 | 8/1968 | Machell | 117/46 |
| 3,438,587 | 4/1969 | Jackson, Jr. | 156/174 |

Primary Examiner—Benjamin R. Padgett
Assistant Examiner—E. E. Lehmann
Attorney—Cushman, Darby & Cushman

[57] ABSTRACT

A method of treating a length of material comprising winding the material onto a plurality of flanged bobbins, disposing the bobbins coaxially end to end in a line, and passing the line of flanged bobbins into, through, and out of a treatment chamber, the treatment chamber having inlet and outlet conduits through which the bobbins pass and to which the flanges of bobbins are substantially sealed throughout their passage therethrough.

5 Claims, 3 Drawing Figures

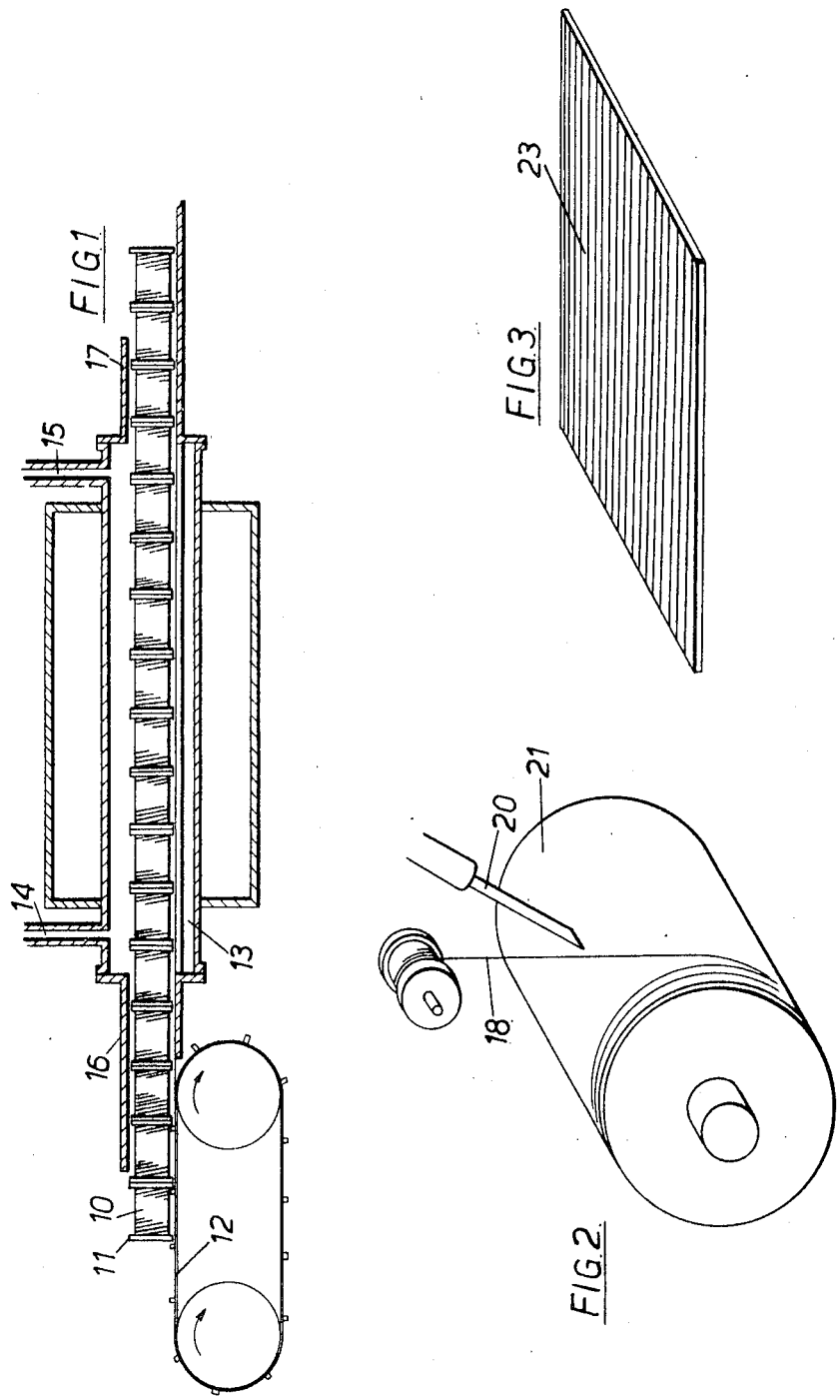

METHOD OF TREATING A LENGTH OF MATERIAL

This invention concerns a method of treating a length of material and, although the invention is not so restricted, it is more particularly concerned with a method of carbonizing and graphitizing oxidized polyacrylonitrile or other carbonaceous fibrous material.

According to the present invention, there is provided a method of treating a length of material comprising winding the material onto a plurality of flanged wound bobbins, disposing the bobbins coaxially end to end in a line, and passing the line of wound bobbins into, through, and out of a sealed treatment chamber, the sealed treatment chamber having inlet and outlet conduits through which the bobbins pass and to which the flanges of the wound bobbins are substantially sealed throughout their passage therethrough, the inlet and outlet conduits having substantially the same shape and cross-sectional dimensions as the bobbin flanges.

Preferably the line of flanged bobbins is passed continuously through the treatment chamber.

The treatment chamber is preferably a furnace which is provided with an inert atmosphere. The said furnace may have a temperature gradient therein between the said inlet and outlet conduits, the temperature at the outlet conduit being substantially greater than the temperature at the inlet conduit. Thus, the length of material wound on to the bobbins may be a length of oxidized carbonaceous fibrous material, this material being successively carbonized and graphitized in in the said furnace. As indicated above, the fibrous material may be polyacrylonitrile.

The flanged bobbins may, for example, be graphite bobbins.

The graphitized fibrous material, after being withdrawn from the furnace, may be formed into a resin impregnated sheet.

Thus the graphitized fibrous material may be resin impregnated immediately prior to being wound onto a drum, the resulting cylinder of resin impregnated fibrous material being axially slit to remove it from the drum and to form it into the said sheet.

The invention also comprises a length of material which has been treated by the method set forth above.

The invention is illustrated, merely by way of example, in the accompanying drawings, in which:

FIG. 1 is a diagrammatic sectional view of a furnace which may be used in the method of the present invention, FIG. 2 is a diagrammatic perspective view illustrating the manner in which fibrous material which has been graphitized in the furnace of FIG. 1 is resin impregnated, and FIG. 3 is a perspective view of a sheet of resin impregnated fibrous material so formed.

A length of polyacrylonitrile fibrous material which has been oxidized in air is wound onto a plurality of graphite bobbins 10 (FIG. 1) each of which has end flanges 11. The bobbins 10 are formed coaxially end to end into a line on an endless belt 12 which serves to pass them continuously into, through, and out of a cylindrical furnace chamber 13. A flow of nitrogen is passed (by means not shown) continuously through the interior of the furnace chamber 13, the nitrogen passing into the furnace chamber 13 through an inlet pipe 14 and being withdrawn therefrom through an outlet pipe 15.

Alternatively, instead of employing nitrogen, other inert gases such as argon may be employed.

The furnace chamber 13 is provided with an inlet conduit 16 and an outlet conduit 17 whose internal diameters are very slightly larger than the external diameters of the flanges 11. Accordingly, the bobbins 10 are substantially sealed to the inlet and outlet conduits 16, 17 throughout their passage therethrough, and the line of bobbins may be passed continuously through the furnace chamber 13 while maintaining a high degree of sealing between the external atmosphere and the inert atmosphere within the furnace chamber 13.

The furnace chamber 13 has a substantial temperature gradient therein between the inlet conduit 16 and the outlet conduit 17. Thus, the temperature adjacent the inlet conduit 16 may be of the order of 250° C. while the temperature adjacent the outlet conduit 17 may be of the order of 1,000° to 1,600° C. The oxidized polyacrylonitrile fibre which has been passed into the furnace chamber 13 is thus successively carbonized and graphitized therein. As will be appreciated, in order to effect the necessary carbonization and graphitization, a low rate of traverse will have to be employed through the furnace chamber 13.

Although the furnace chamber 13 is shown as having one single inlet conduit 16 and one single outlet conduit 17 with one single line of bobbins 10 passing therethrough, it will be appreciated that in practice the furnace chamber 13 may be provided with a number of such lines of bobbins 10 each of which will pass through respective inlet and outlet conduits of a common furnace chamber.

After the bobbins 10 have passed out of the outlet conduit (or conduits) 17, the fibrous material 18, which has now been graphitized, is unwound therefrom, as illustrated very diagrammatically in FIG. 2, and is resin impregnated by a metered resin supply delivered through a pipe 20. The resin employed may, for example, be an epoxy resin, although many other synthetic resins may also be employed.

As will be seen from FIG. 2, the resin impregnation is effected immediately prior to the fibrous material 18 being wound onto a drum 21 which is covered with a sheet of release paper (not shown). After the resin impregnated fibre on the drum 21 has been cured, a cylinder of resin impregnated fibrous material will be formed on the drum 21, and this is then axially slit (by means not shown) so as to remove it, and the release paper, from the drum 21. The sheet of release paper is then stripped away, leaving a sheet 23 of resin impregnated fibrous material.

We claim:

1. A method of thermally treating a length of material comprising the steps of:
   a. winding the material onto a plurality of flanged bobbins,
   b. disposing the bobbins thus wound coaxially end to end in a line,
   c. providing a furnace having inlet and outlet conduits,
   d. providing an atmosphere in the furnace inert to the wound material,
   e. continuously passing the line of flanged bobbins thus wound into, through and out of the furnace and maintaining the bobbin flanges when passing through the inlet and outlet conduits in a sealing relationship therewith, thereby sealing the furnace, and
   f. removing the thus treated material from the bobbins.

2. The method as claimed in claim 1 wherein a temperature gradient is provided in the furnace between the inlet and outlet conduits whereby the temperature at the outlet is greater than the temperature at the inlet.

3. The method as claimed in claim 2 wherein the material of step (a) is a length of oxidized carbonaceous fibrous material and as the wound fibrous material passes through the furnace of step (e) it is successively carbonized and graphitized.

4. The method as claimed in claim 3 including the additional steps of
   g. impregnating the graphitized fibrious material with a resin and
   h. immediately winding the resin impregnated material onto a drum and producing a cylinder of resin impregnated fibrous material,
   i. axially slitting the fibrous cylinder to remove it from the drum, and
   j. forming the resin impregnated fibrous material into a sheet.

5. A method as claimed in claim 3 in which the fibrous material is polyacrylonitrile.

* * * * *

UNITED STATES PATENT OFFICE
CERTIFICATE OF CORRECTION

Patent No. 3,664,900     Dated May 23, 1972

Inventor(s) Kenneth Cuckson et al

It is certified that error appears in the above-identified patent and that said Letters Patent are hereby corrected as shown below:

In the above identified patent, please add the following to the front page format after the "Assignee":

[30]   Foreign Application Priority Data

May 2, 1968   Great Britain . . . . . . . 20909/68

Signed and sealed this 5th day of September 1972.

(SEAL)
Attest:

EDWARD M. FLETCHER, JR.
Attesting Officer

ROBERT GOTTSCHALK
Commissioner of Patents